Oct. 23, 1962 T. N. BUSCH ETAL 3,059,677
TIMBER HARVESTER AND METHOD OF USE
Filed Feb. 1, 1960 14 Sheets-Sheet 1
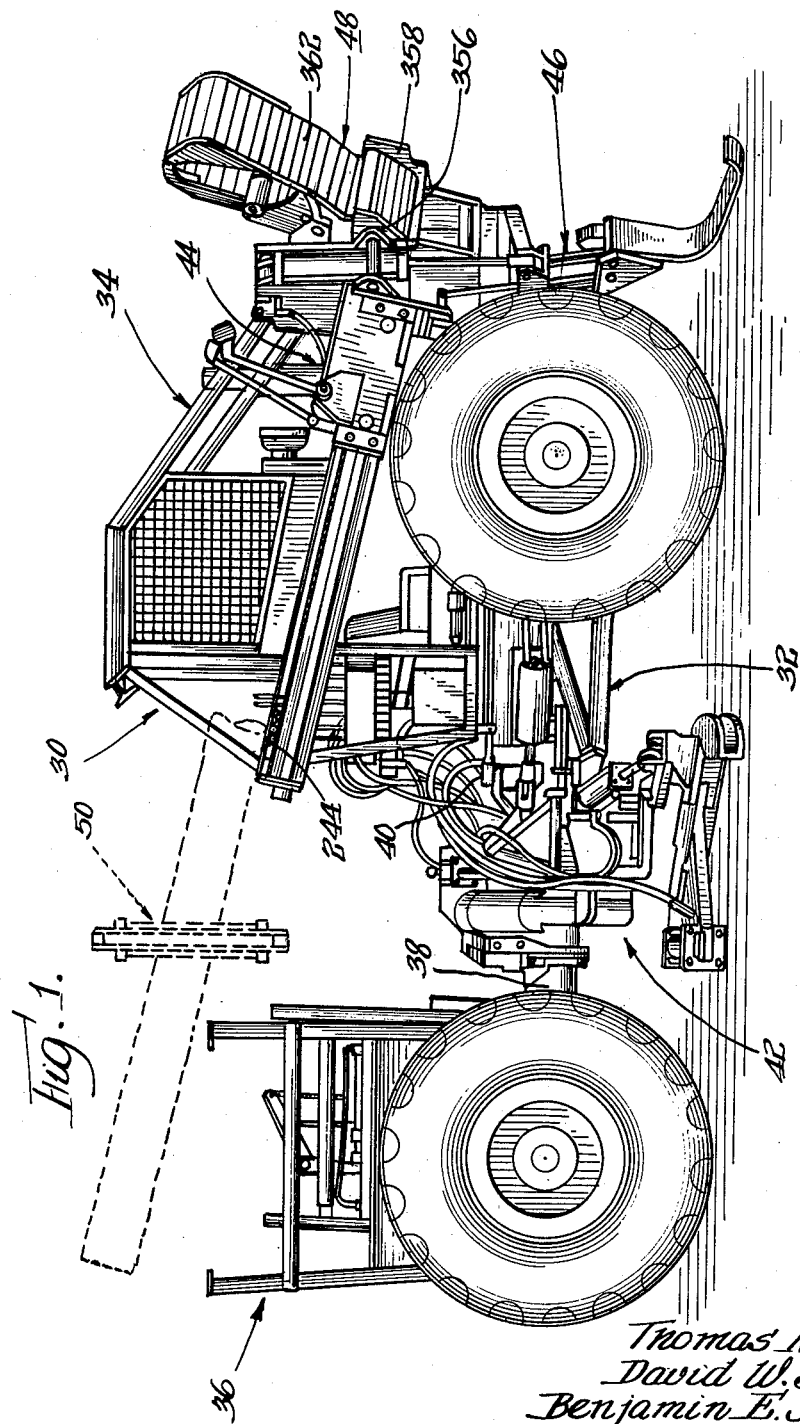
INVENTORS.
Thomas N. Busch
David W. Jasper
Benjamin E. Jasper
By: Olson & Trexler  attys.

Oct. 23, 1962    T. N. BUSCH ETAL    3,059,677
TIMBER HARVESTER AND METHOD OF USE
Filed Feb. 1, 1960    14 Sheets-Sheet 2
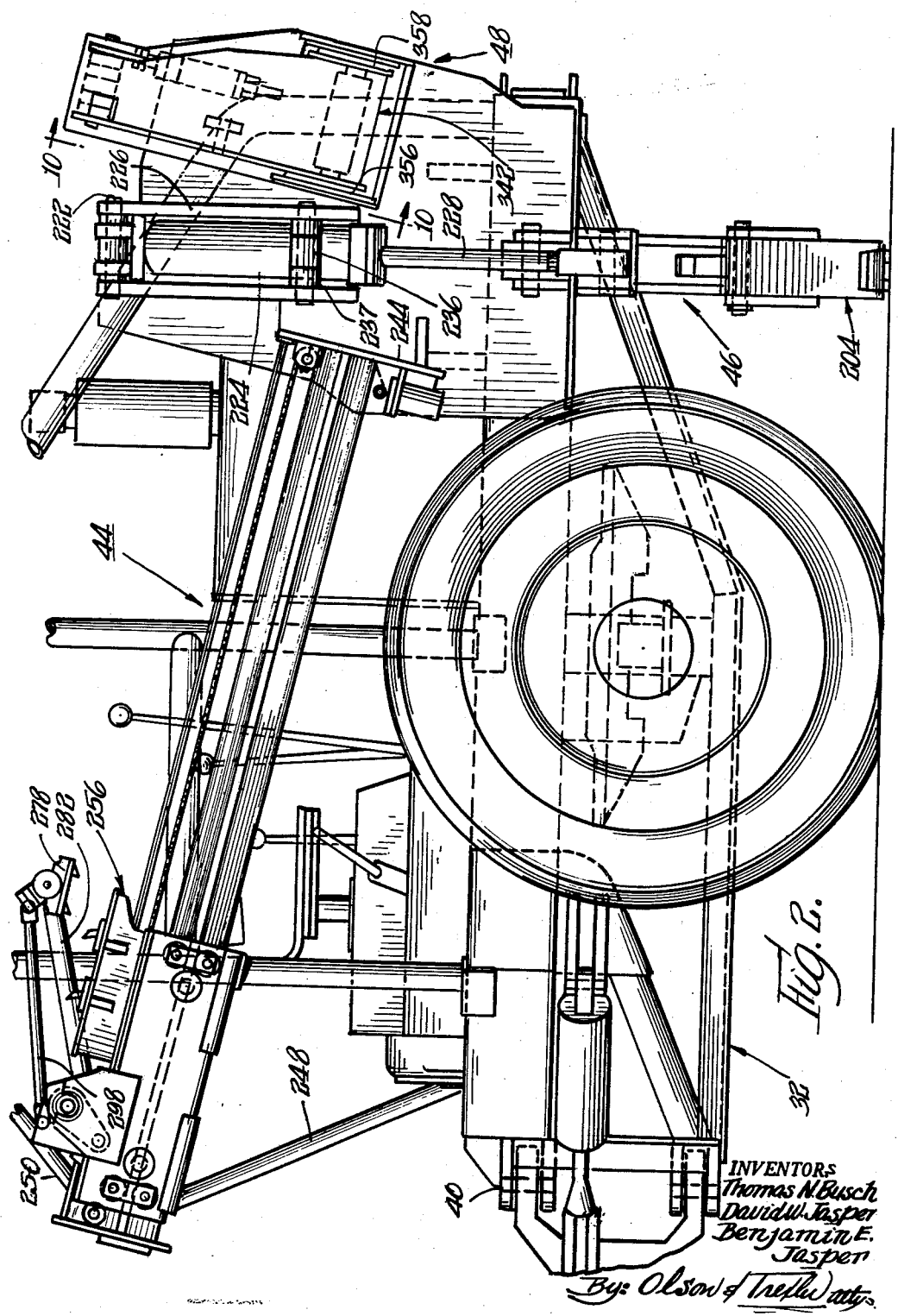
INVENTORS
Thomas N. Busch
David W. Jasper
Benjamin E. Jasper
By: Olson & Trexler attys

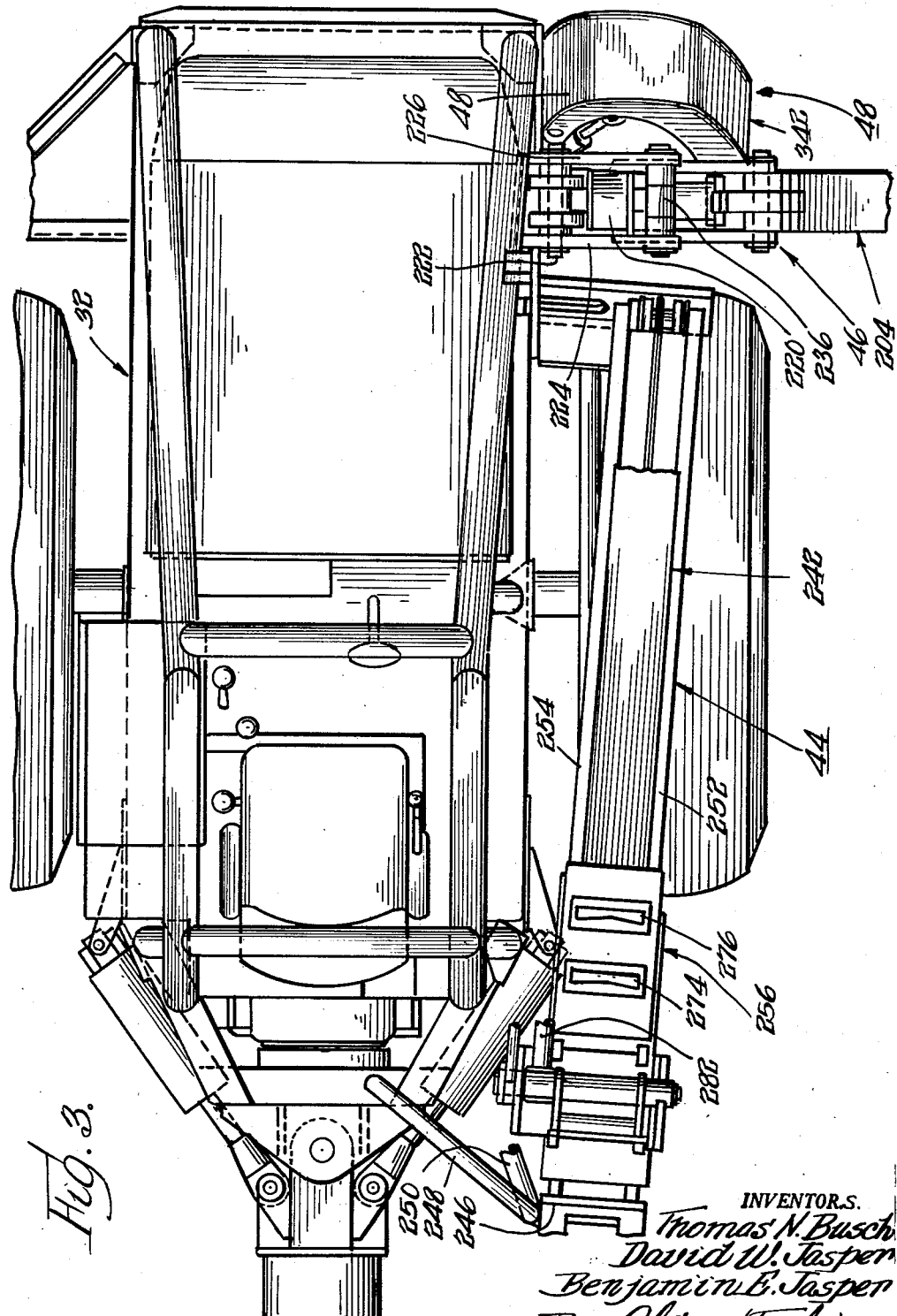

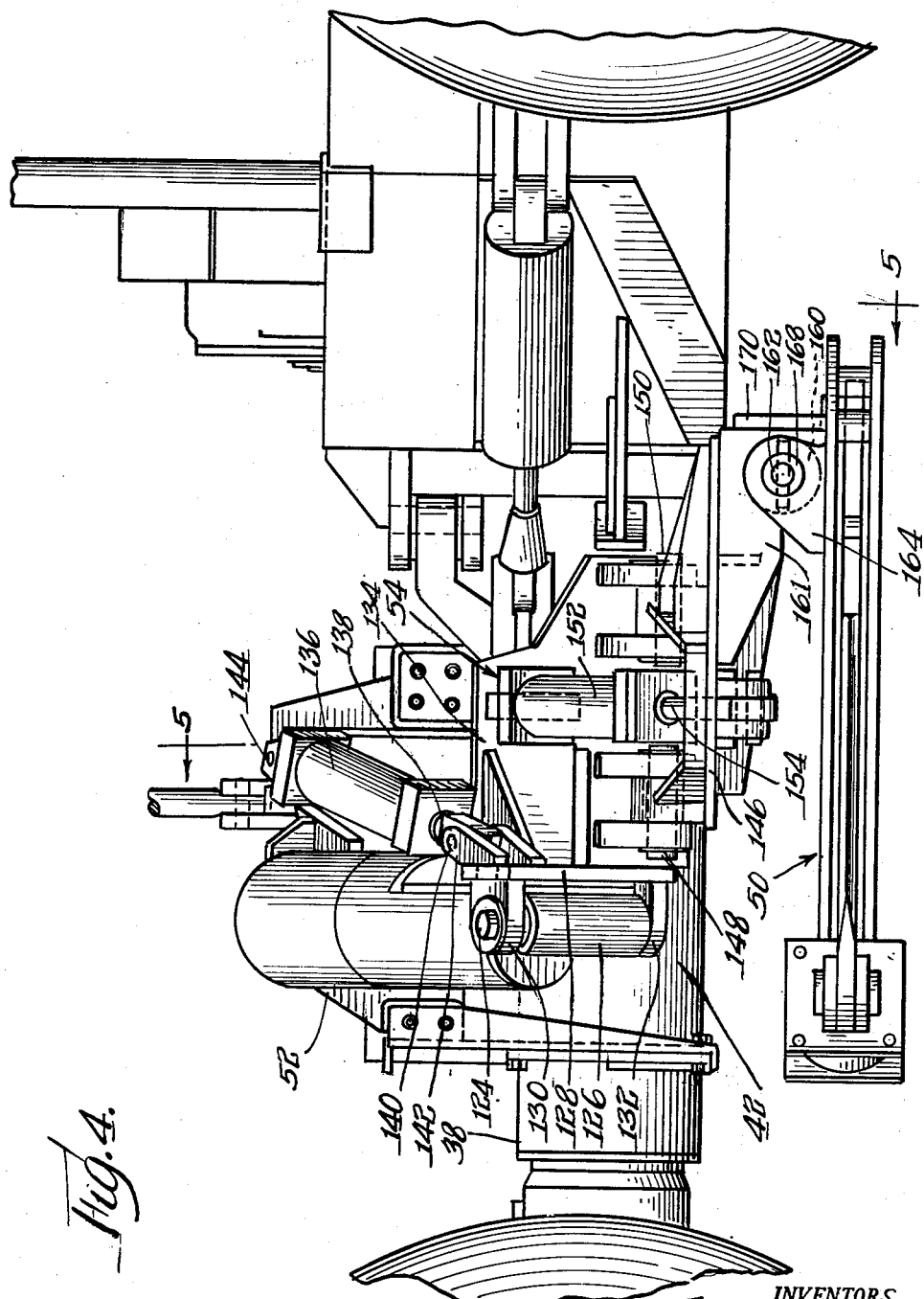

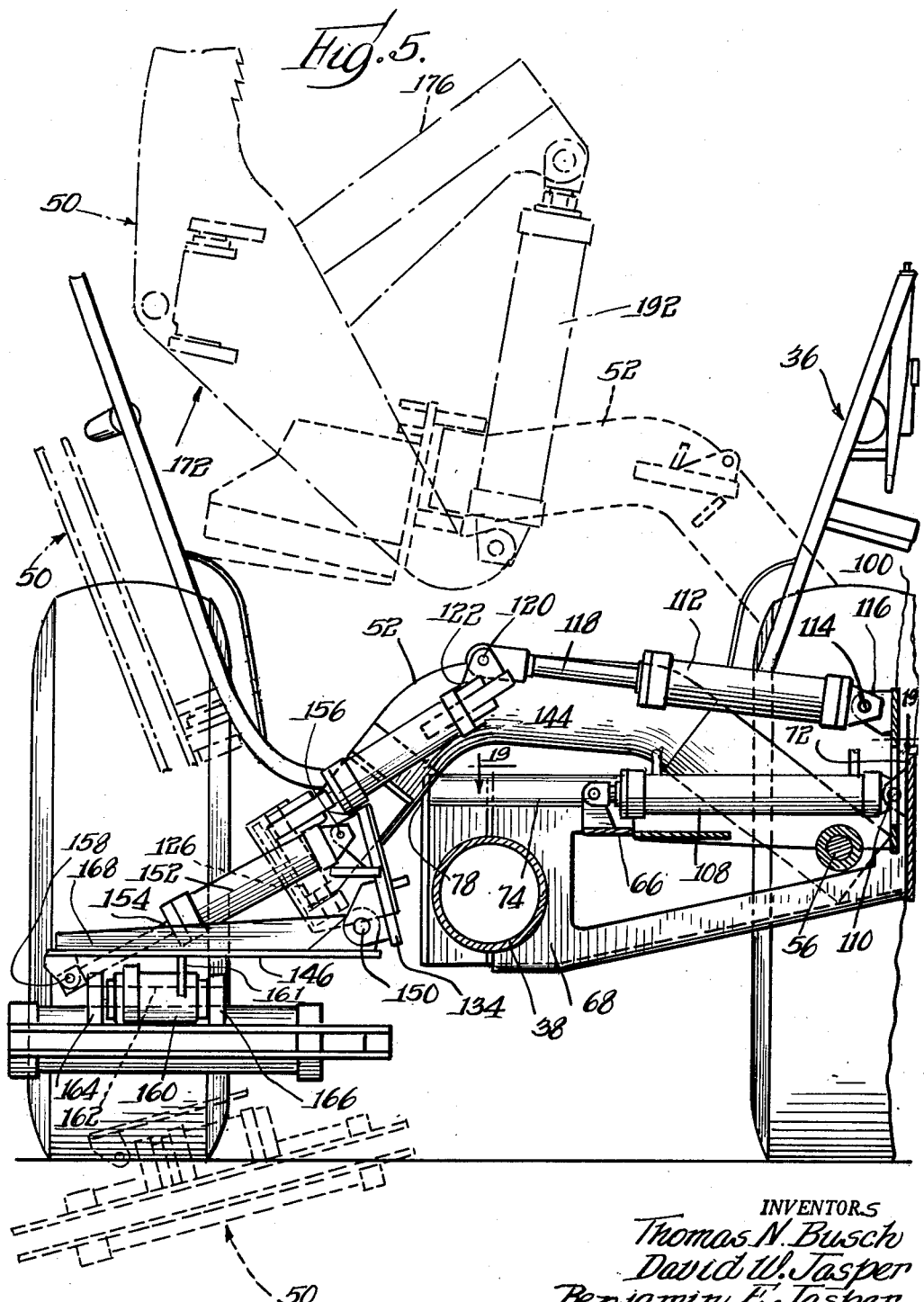

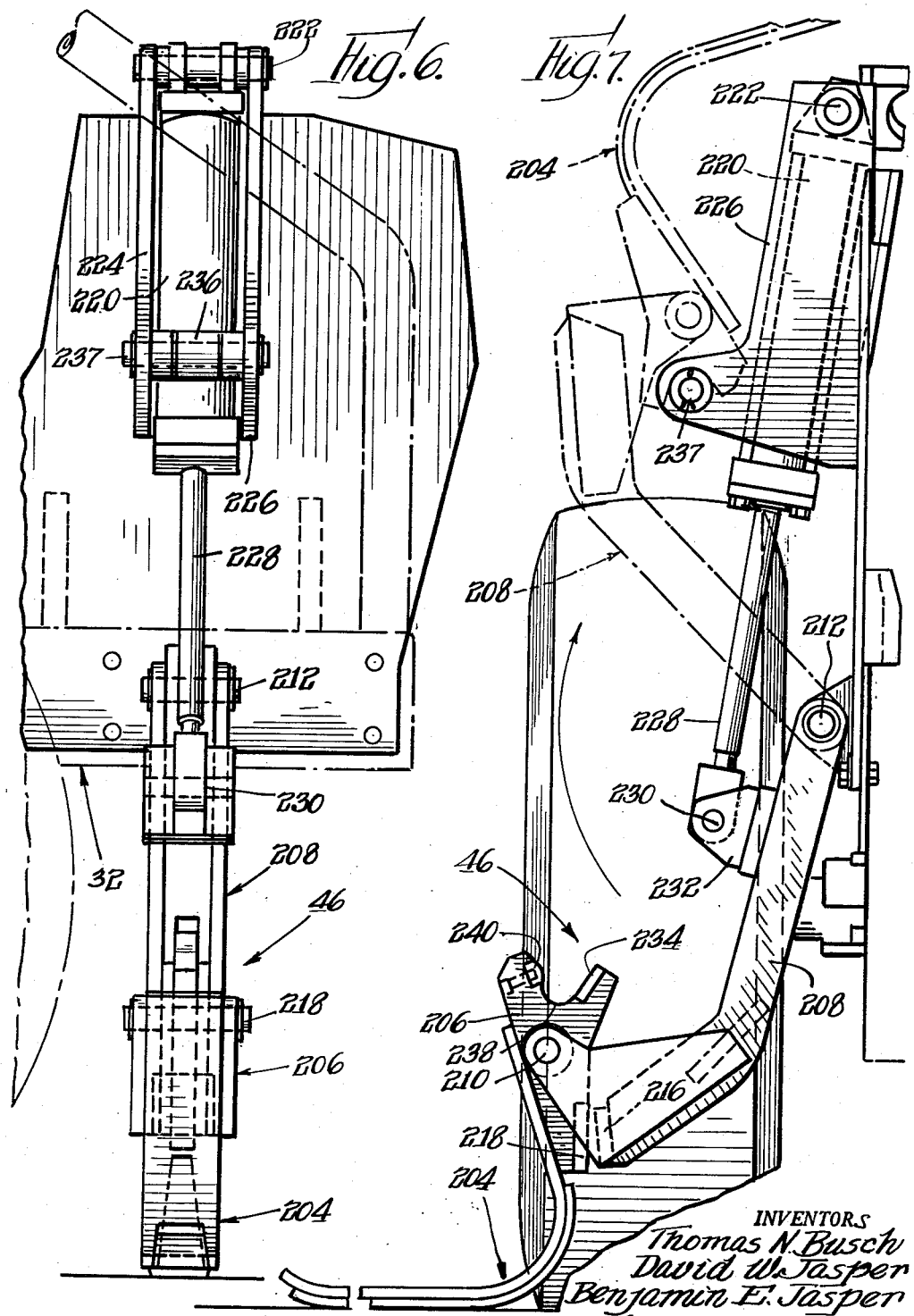

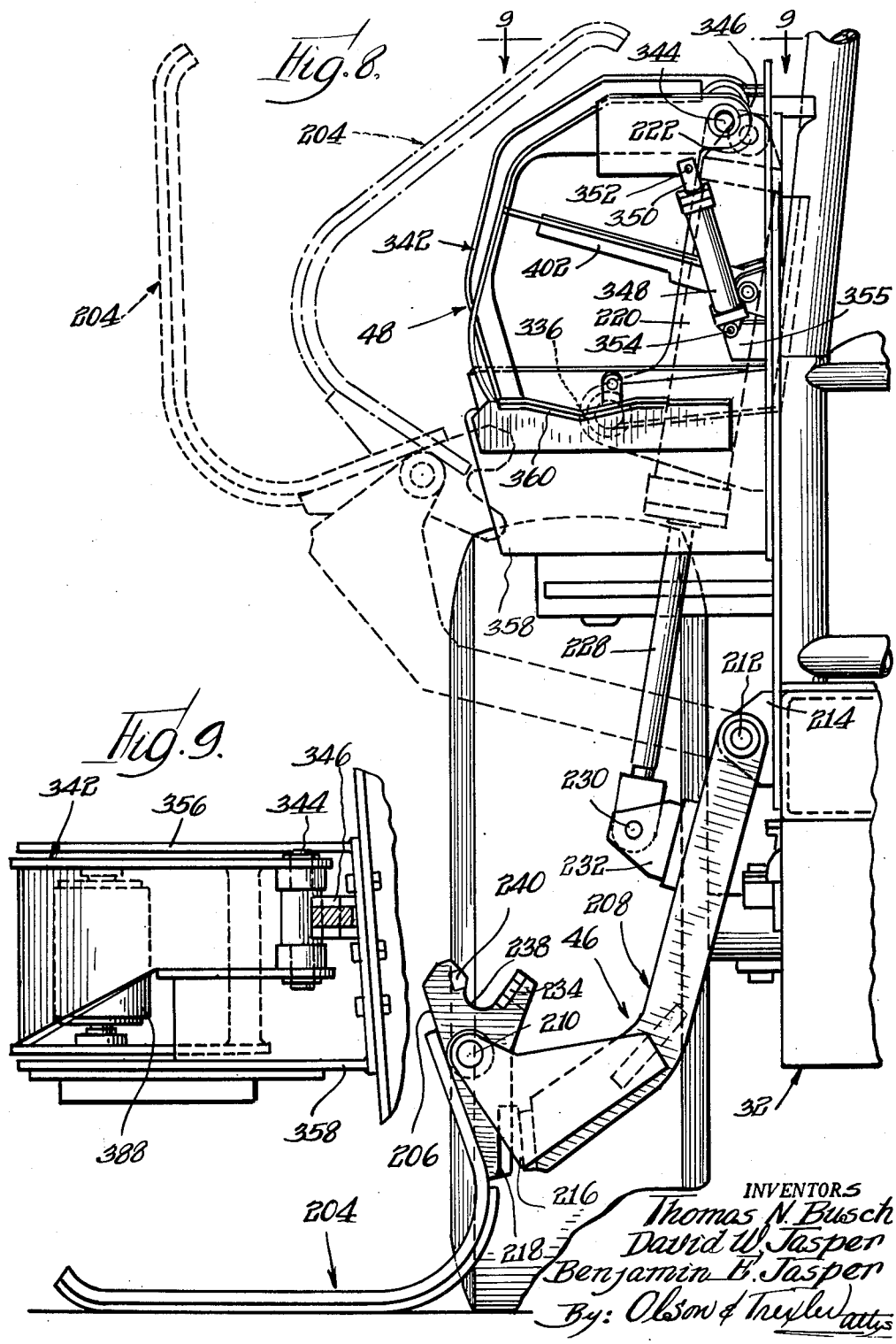

Oct. 23, 1962 T. N. BUSCH ETAL 3,059,677
TIMBER HARVESTER AND METHOD OF USE
Filed Feb. 1, 1960 14 Sheets-Sheet 8
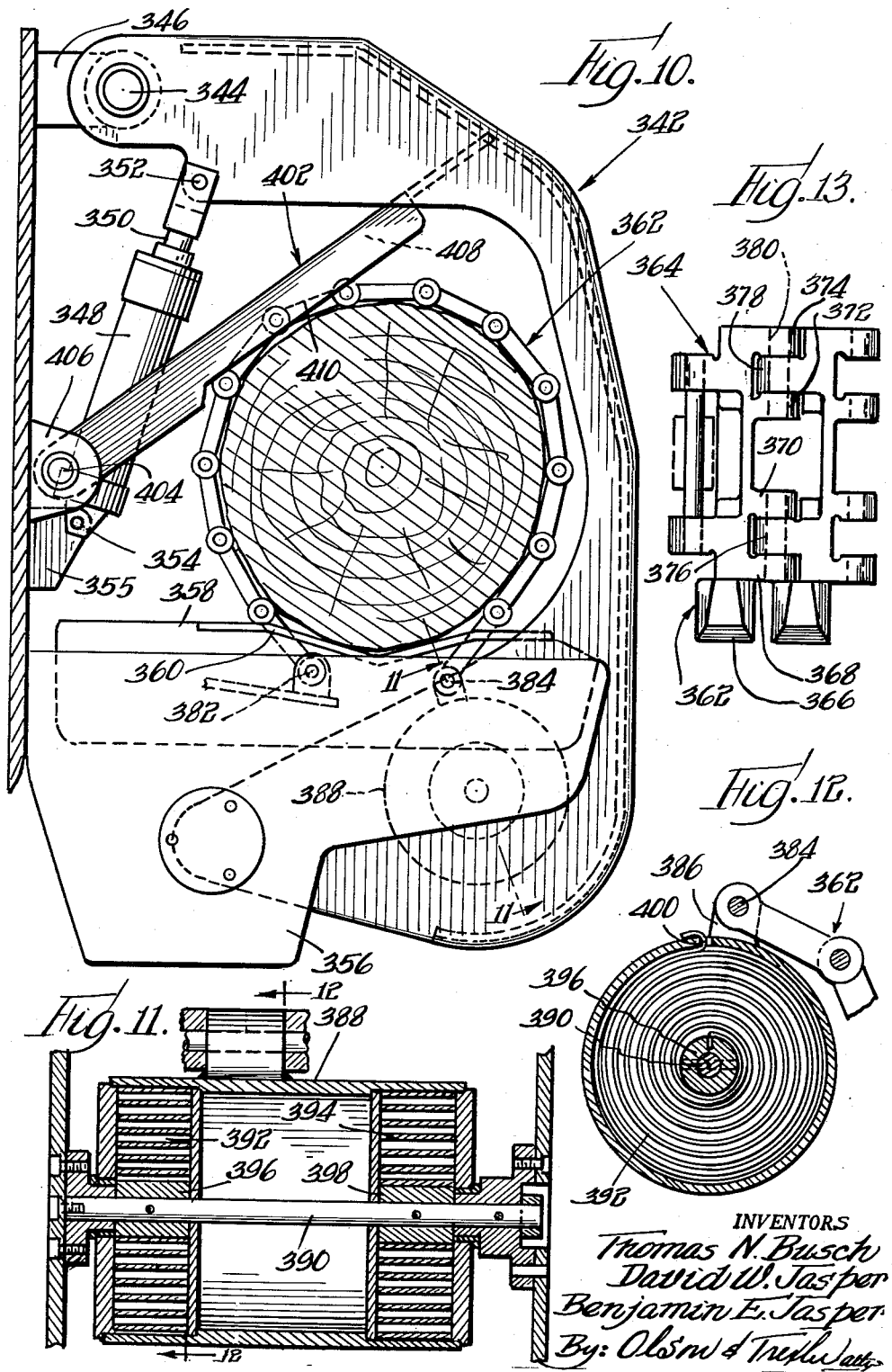
INVENTORS
Thomas N. Busch
David W. Jasper
Benjamin E. Jasper
By: Olson & Trexler

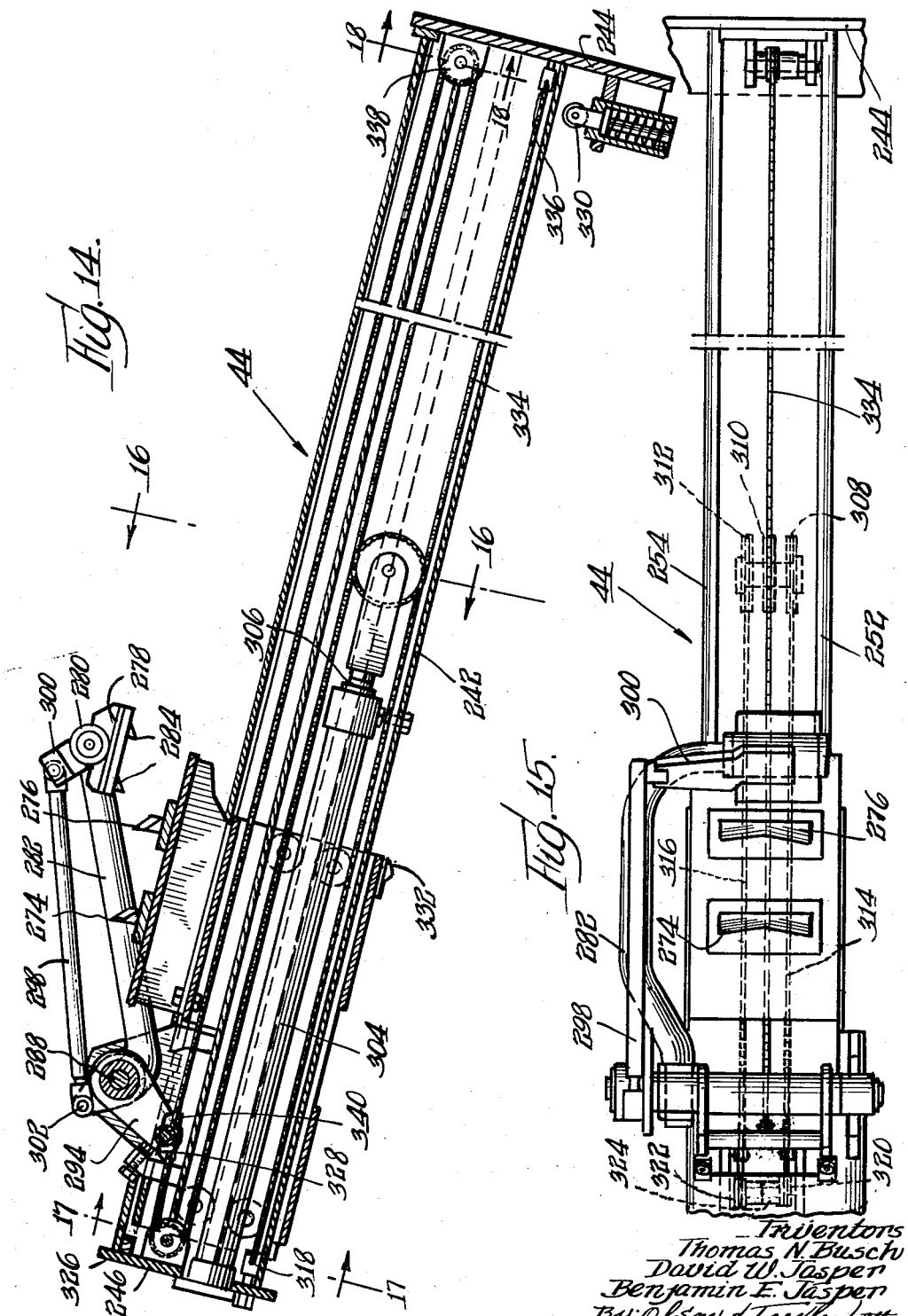

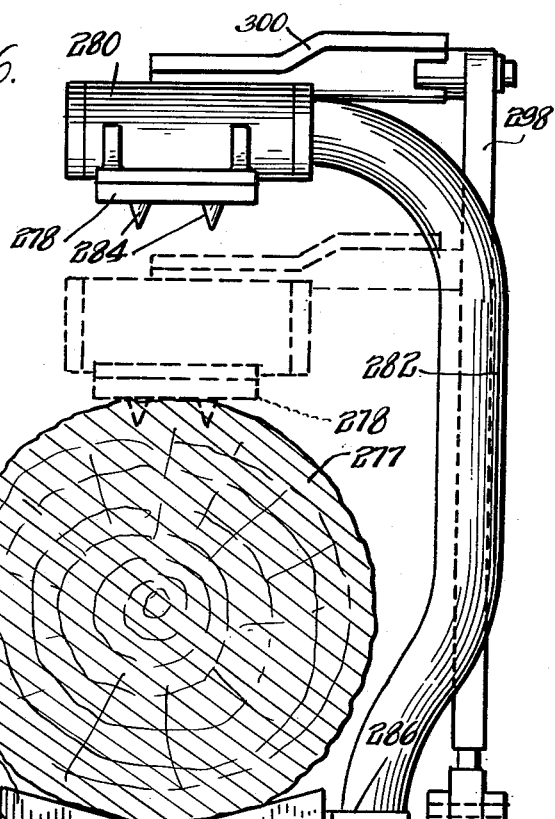

Oct. 23, 1962 T. N. BUSCH ETAL 3,059,677
TIMBER HARVESTER AND METHOD OF USE
Filed Feb. 1, 1960 14 Sheets-Sheet 11

INVENTORS
Thomas N. Busch
David W. Jasper
Benjamin E. Jasper
By: Olson & Trexler attys.

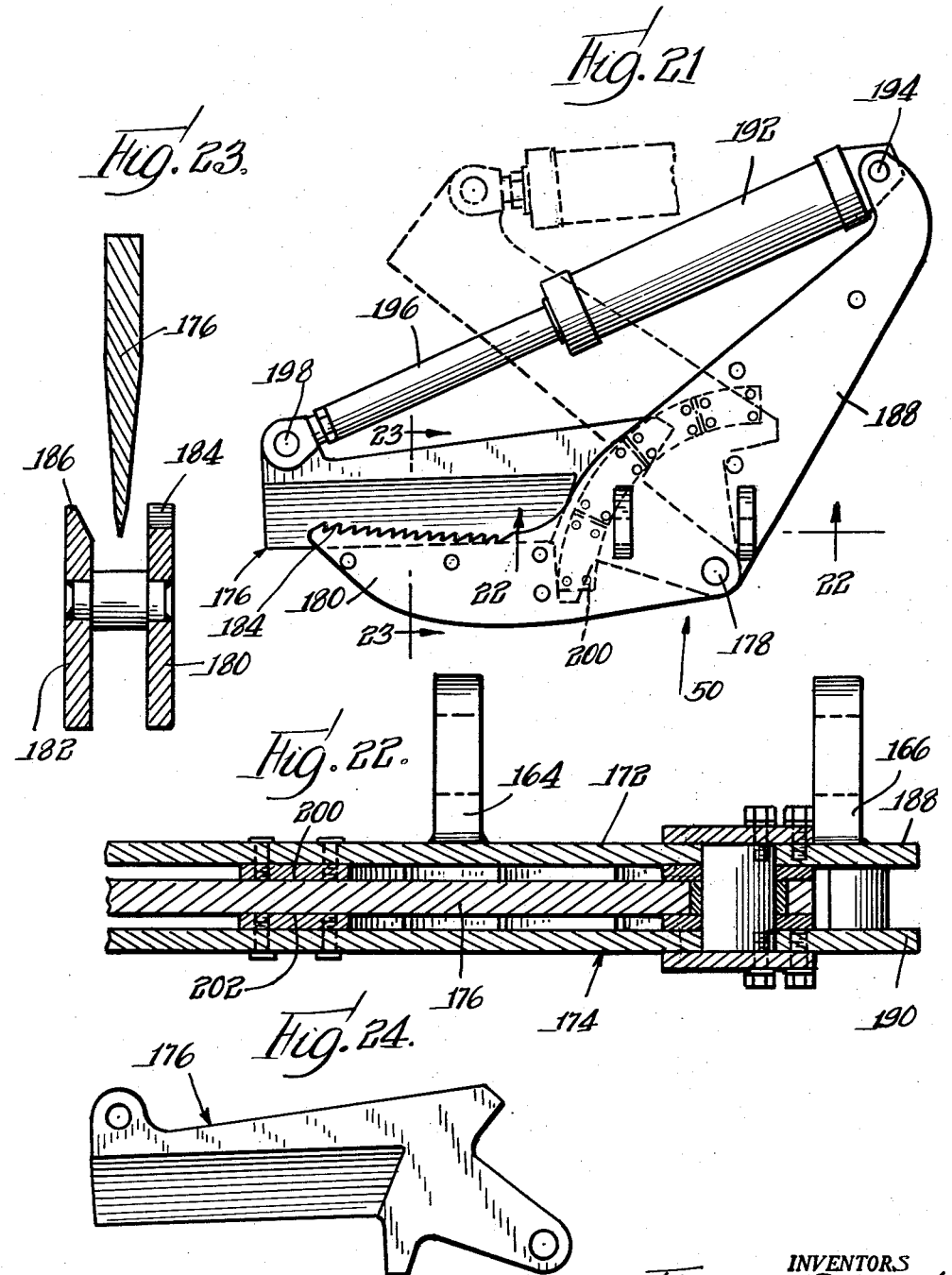

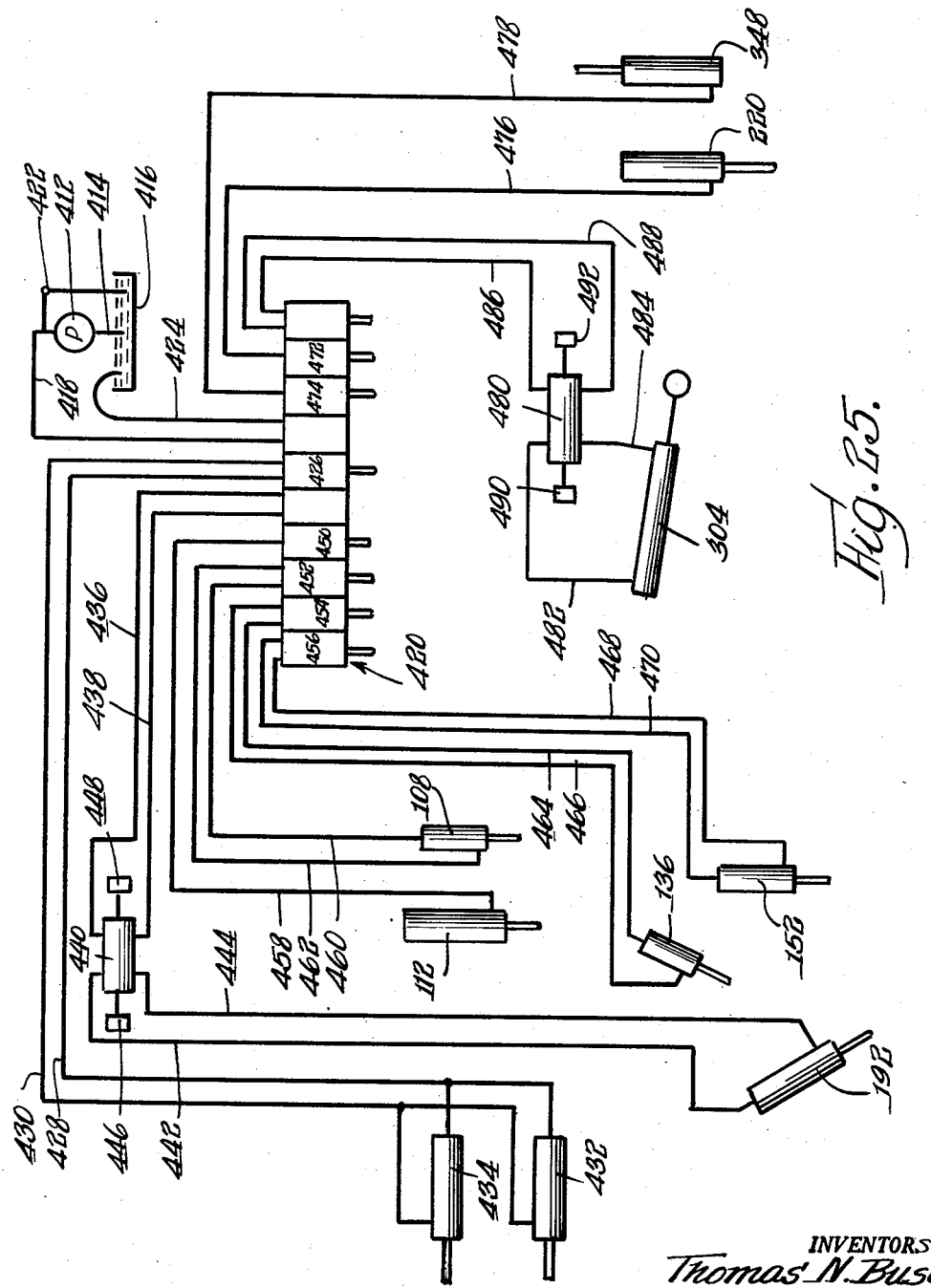

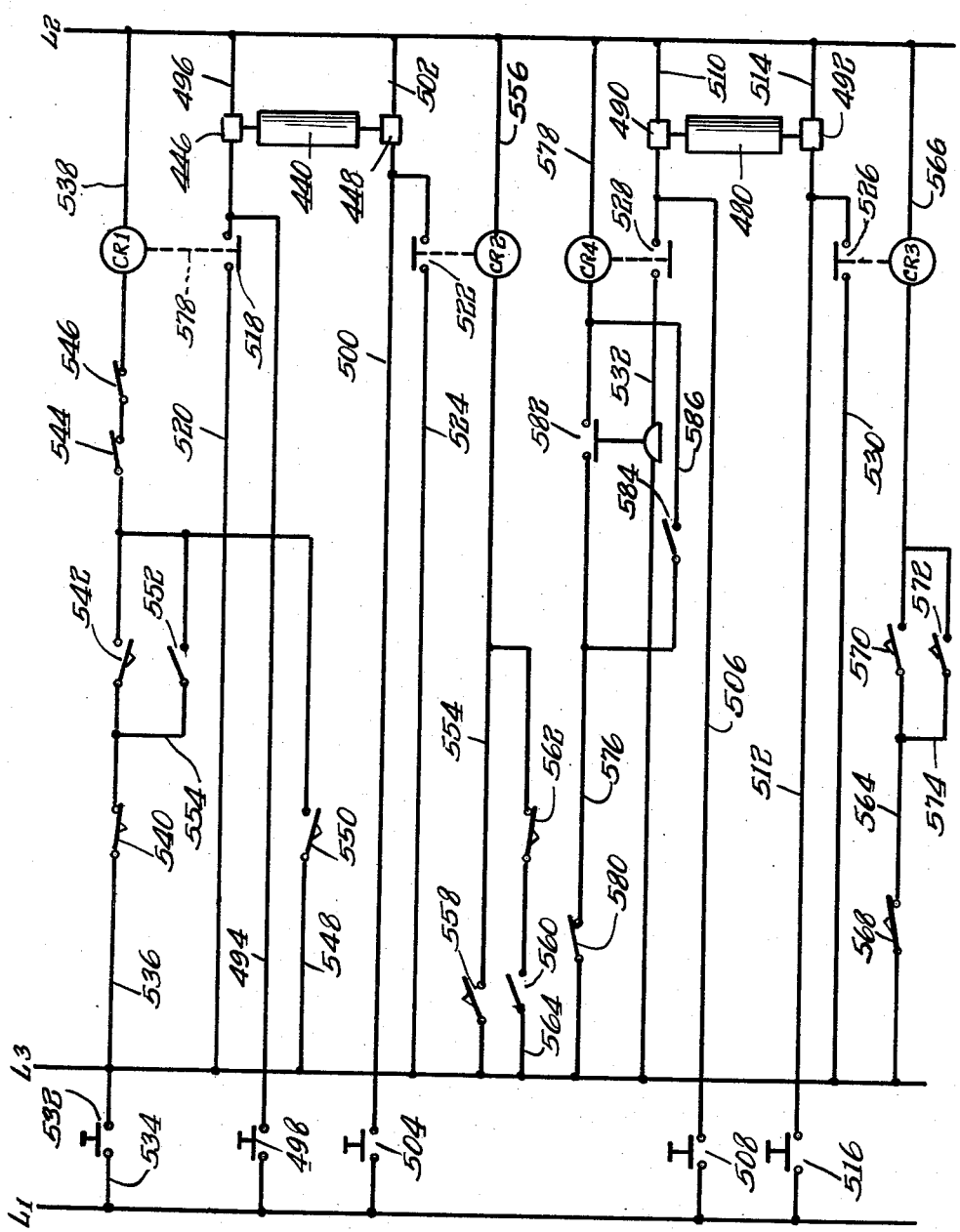

United States Patent Office 3,059,677
Patented Oct. 23, 1962

3,059,677
TIMBER HARVESTER AND METHOD OF USE
Thomas N. Busch, Daphne, Ala.; David W. Jasper, 244 E. Pearson St., Chicago, Ill.; and Benjamin E. Jasper, 9 Market Lane, Kankakee, Ill.
Filed Feb. 1, 1960, Ser. No. 5,919
16 Claims. (Cl. 144—309)

The present invention relates to a novel method and apparatus for processing trees, and more specifically to a novel method and apparatus for harvesting trees.

In our United States Patent 2,876,816, dated March 10, 1959, and our copending application Serial No. 681,044, filed August 29, 1957, issued April 25, 1961 as Patent No. 2,981,301, methods and apparatus for harvesting trees are disclosed and claimed which methods and apparatus represent substantial advancements in the tree harvesting art. The present invention contemplates a still further significant advancement in the tree harvesting art, and more specifically, it is an important object of the present invention to provide a novel method and apparatus for harvesting trees in an improved, more efficient and more economical manner.

It is a further object of the present invention to provide a novel method and apparatus whereby trees may be felled, sectionalized or bucked and gathered or deposited in a bundle easier and faster and with reduced manipulations of the apparatus.

A more specific object of the present invention is to provide a novel apparatus of the above described type which is constructed so that it may be more readily properly positioned with respect to a tree to be harvested.

Still another object of the present invention is to provide a novel apparatus of the above described type having improved means for automatically severing limbs from the tree trunk as the trunk is advanced for accomplishing sectionalizing or bucking thereof.

A still more specific object of the present invention is to provide a novel method and apparatus whereby a felled tree is subsequently felled and bucked in a manner so that sections thereof are deposited directly onto a stack or bundle in a predetermined manner as they are severed without the aid of or need for means for handling the sections after they are severed.

Still another object of the present invention is to provide a novel apparatus of the above described type with improved cutting means which may be manipulated for severing a standing tree and for bucking or sectionalizing a felled tree.

Other objects and advantages of the present invention will become apparent from the following description wherein:

FIG. 1 is a side perspective view showing an apparatus incorporating features of the present invention;

FIG. 2 is an enlarged fragmentary side elevational view showing a forward end portion of an apparatus incorporating features of the present invention;

FIG. 3 is a fragmentary plan view of the portion of the apparatus shown in FIG. 2;

FIG. 4 is a fragmentary side elevational view showing an intermediate portion of the apparatus of the present invention and more specifically showing the severing means of the apparatus in a lowered or tree felling position;

FIG. 5 is a fragmentary sectional view taken generally along line 5—5 in FIG. 4 and further shows in broken lines various positions to which the severing means may be adjusted;

FIG. 6 is an enlarged fragmentary side elevational view showing a portion of the apparatus which is adapted to lift a felled tree up to and deposit the tree on traversing or feeding means;

FIG. 7 is a fragmentary front elevational view of the portion of the apparatus shown in FIG. 6;

FIG. 8 is a fragmentary front end elevational view showing a portion of the apparatus including the tree lifting means and means for severing branches from a tree trunk;

FIG. 9 is a fragmentary view seen from line 9—9 in FIG. 8;

FIG. 10 is an enlarged fragmentary sectional view taken generally along line 10—10 in FIG. 2;

FIG. 11 is a fragmentary sectional view taken along line 11—11 in FIG. 10;

FIG. 12 is a sectional view taken along line 12—12 in FIG. 11;

FIG. 13 shows a portion of the delimbing or branch removing means and more particularly the flexible cutting or blade structure thereof;

FIG. 14 is an enlarged side elevational view partially in section showing the tree feeding or traversing means of the apparatus of the present invention;

FIG. 15 is a plan view of a portion of the apparatus shown in FIG. 14;

FIG. 16 is an enlarged sectional view taken along line 16—16 in FIG. 14;

FIG. 17 is an enlarged sectional view taken along line 17—17 in FIG. 14;

FIG. 18 is an enlarged sectional view taken along line 18—18 in FIG. 14;

FIG. 21 is a fragmentary plan view showing the severing head structure of the apparatus of the present invention;

FIG. 22 is an enlarged sectional view taken along line 22—22 in FIG. 21;

FIG. 23 is an enlarged fragmentary sectional view taken along line 23—23 in FIG. 21;

FIG. 24 is a plan view of the shearing blade incorporated in the severing head structure of the present invention; and FIGS. 25 and 26 are schematic views respectively showing hydraulic and electric control circuits incorporated in the apparatus.

Figure 19:
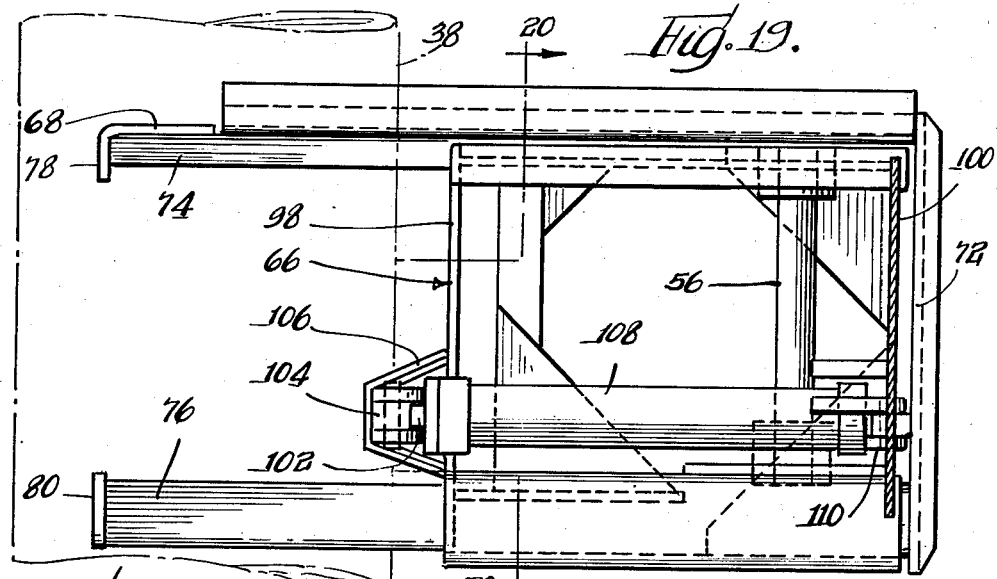
FIG. 19 is an enlarged fragmentary sectional view taken along line 19—19 in FIG. 5.

Referring now more specifically to the drawings wherein like parts are designated by the same numerals throughout the various figures, an apparatus 30 incorporating features of the present invention is shown in FIG. 1. The appartus comprises a self-propelled vehicle 32 having a forward tractor portion 34 and a trailer or cart unit 36 which includes a hollow tubular frame member 38 pivotally connected to the tractor at 40. Of course the tractor unit is provided with its own power plant or engine, and the vehicle preferably includes four-wheel drive means. In addition the self-contained hydraulic control system mentioned further below is provided on the vehicle and powered by the tractor engine for actuating the various mechanisms mounted on the vehicle and also for controlling the vehicle. Since the tractor and trailer portions of the vehicle and the manner in which they are constructed, connected and operated are fully disclosed in the abovementioned copending application, no further detailed description of the vehicle is necessary herein.

A cutting or severing mechanism 42 constructed and arranged in accordance with features of the present invention is mounted on an intermediate portion of the vehicle as will be described in detail below for cutting and felling standing trees and for subsequently sectionalizing or bucking a felled tree. Means 44 is mounted on the tractor portion of the vehicle for traversing or feeding a felled tree to the cutting or severing means during a bucking operation. In accordance with an important feature of the present invention which will be discussed more fully below, it is to be noted that the feeding or traversing means is located for directing the tree upwardly and over the severing means and the trailer or cart 36 so that when a section is severed from the tree it will fall directly into the cart. This feature enables the separate lifting mechanism for loading tree sections on the cart which is shown in the abovementioned patent and copending application to be eliminated while at the same time the sectionalizing and loading operation may be accomplished more efficiently.

Since the traversing or feeding means 44 is mounted at an elevated position, a mechanism 46 is disposed adjacent the forward end of the vehicle for lifting a felled tree upwardly to and depositing the tree on the feeding mechanism 44. In addition means 48 is mounted on the vehicle adjacent the forward end of the traversing mechanism 44, which means 48 is adapted to embrace a tree which is raised by the lifting mechanism 46 and sever branches from the tree as the tree trunk is advanced by the feeding mechanism 44 in the manner described below.

Referring particularly to FIGS. 4, 5 and 19–24, it is seen that the cutting or severing mechanism 42 comprises a cutting head structure 50 adjustably connected with an outer end of a boom arm 52 by bracket and control means 54. The boom arm 52 is in turn pivotally supported at its opposite end on a shaft 56, which shaft extends between opposite bearing members 58 and 60 mounted on opposite side members 62 and 64 of a carriage structure 66 shown best in FIGS. 5, 19 and 20.

Figure 20:
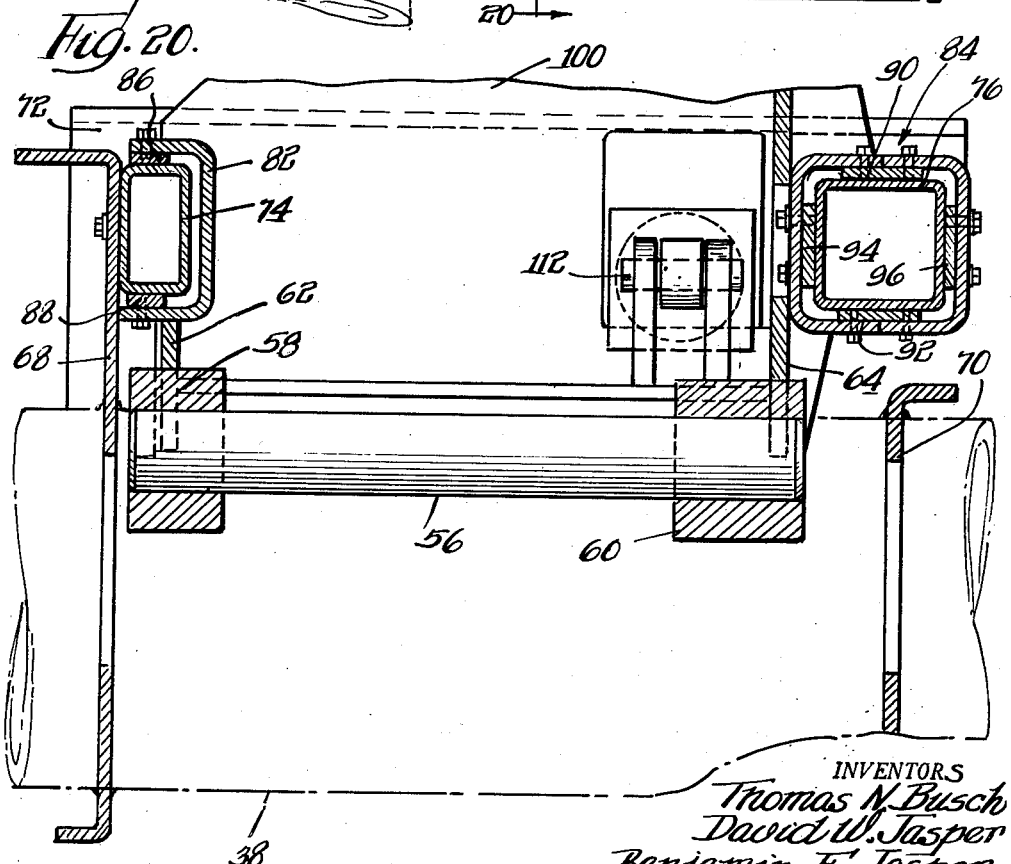
FIG. 20 is a further enlarged sectional view taken along line 20—20 in FIG. 19.

The carriage 66 is adapted to be shifted back and forth transversely of the longitudinal axis of the vehicle in order to facilitate positioning of the cutting head for felling a standing tree and also for sectionalizing or bucking a felled tree. More specifically, bracket members 68 and 70 are welded or otherwise suitably secured to the tubular frame member 38 of the vehicle as shown in FIGS. 5, 19 and 20. An end plate 72 extends between and is secured to outer ends of the bracket members, and a pair of spaced apart parallel guide and support rails 74 and 76 extend between the outer end plate 72 and transversely turned end portions 78 and 80 of the bracket members.

The carriage 66 includes elongated parallel slide members 82 and 84 along its opposite sides respectively embracing the rails 74 and 76 so that the carriage is slidably mounted for back and forth movement transversely with respect to the longitudinal axis of the vehicle. As indicated in FIG. 20, bearing blocks 86 and 88 are preferably provided between upper and lower opposing horizontal portions of the guide rail 74 and the slide member 82, which bearing blocks are preferably detachably connected with the slide member 83 by means of screws. Similar upper and lower bearing blocks 90 and 92 are provided between upper and lower horizontal portions of the slide member 84. The slide member 84 preferably comprises a pair of opposing channel members for completely encircling the rail 76, and bearing blocks 94 and 96 are provided between opposing vertical surfaces of the slide member and rail for resisting binding between the carriage and the guide and support rails in a direction extending transversely of the rails.

The carriage 66 includes a transverse member 98 extending between and welded or otherwise secured to forward ends of the opposite side members 62 and 64, and another transverse and upstanding plate member 100 extending between and welded or otherwise secured to trailing ends of the opposite side members. As shown best in FIGS. 5 and 19, an outer end of a piston rod 102 is pivotally connected as at 104 with bracket means 106 fixed on the transverse carriage member 98, which piston rod is associated with a double acting hydraulic cylinder 108 pivotally connected as at 110 to the upstanding transverse end plate 72 of the carriage supporting bracket or frame means. The hydraulic cylinder 108 is adapted to be actuated in the manner discussed hereafter for either advancing or retracting the carriage 66.

The boom arm 52 is adapted to be pivoted between the various lowered and raised positions shown by full and broken lines in FIG. 5. In order to accomplish this adjustment of the boom arm, a single acting hydraulic cylinder 112 is pivotally connected by pin means 114 to brackets 116 welded or otherwise fixed on the transverse plate member 100 of the carriage, and a piston rod 118 extends from this hydraulic cylinder and is pivotally connected by a pin 120 to bracket means 122 welded to the boom arm. It will be noted that the pivot 56 for the boom arm 52 and the pivot 114 for the control cylinder 112 are located with respect to each other so that the piston rod 118 is always under tension whereby to minimize any possibility of injury to the piston rod as the result of bending or buckling.

The connecting and control means 54 between the cutting head and the boom arm 52 is constructed so that the cutting head may be positioned generally horizontally as shown in the lower portion of FIG. 5 for felling a standing tree. The means 54 is also constructed so that the cutting head 50 may be positioned in a generally vertical plane as shown in the uppermost broken line portion of FIG. 5 for permitting it to be used for sectionalizing or bucking a tree. More specifically, a pivot shaft 124 is supported by a bushing 126 mounted on the outer end of the boom arm 52 as shown in FIGS. 4 and 5 so that the shaft 124 is disposed transversely with respect to the outer end portion of the boom arm 52. It will be noted that the boom arm is arched so that its outer end portion may be lowered around the central tubular frame member 38 of the vehicle in order to permit the cutting head to be positioned adjacent to or even on the ground during a tree felling operation.

A bracket structure is pivotally carried by the shaft 124, which bracket structure comprises a base plate 128 having ears 130 and 132 extending therefrom for receiving the shaft 124. Another plate member 134 is welded to and extends from the base plate member 128. As shown in FIGS. 4 and 5, the plate member 134 is disposed in a plane extending perpendicularly with respect to the base plate member 128 and at an acute angle with respect to the axis of the pivot shaft 124. The arrangement of the plate member 134 is such that when the bracket structure is pivoted from the position shown in FIG. 4 and in full lines in FIG. 5 ninety degrees around the shaft 124 to the uppermost broken line position shown in FIG. 5, the plate member 134 provides a substantially straight extension of the boom arm 52.

In order to control the position of the bracket structure, a double acting hydraulic cylinder 136 (FIG. 4) having a piston rod 138 extending therefrom is provided. The piston rod is pivotally connected by pin 140 to suitable bracket means 142 secured to the plate member 128, and the opposite end of the cylinder is pivotally connected by pin means 144 to the bracket means 122 secured to the boom.

The support and control structure 54 comprises another plate member 146 pivotally connected by aligned pins 148 and 150 to suitable apertured ears welded to the plate member 134 for pivotal movement about an axis disposed along a lower margin of and parallel to the plate member 134 as shown in FIGS. 4 and 5. A double acting hydraulic cylinder 152 having a piston rod 154 extending therefrom is disposed between the plate members 134 and 136 for controlling the position of the plate member 146. One end of the cylinder 152 is connected with the plate member 134 by pivot means 156, and the outer end of the piston rod is connected with the outer margin of the plate member 146 by pivot means 158.

The cutting head 50 is connected to and beneath the plate member 146. More specifically, a steel sleeve 160 is welded or otherwise secured to brackets 161 which in turn are welded to the plate member 146, and a shaft 162 extends through the sleeve and apertured ears 164 and 166 welded or otherwise secured to the cutting head. A rubber bushing 168 is provided between the sleeve and the shaft for absorbing shocks which may be imparted to the mechanism during the operation thereof. The cutting head is free to rotate around the shaft 162 except that a stop member 170 is welded to the bracket means 162 for engaging a top surface of the cutting head and thereby limiting rotation of the cutting head around the shaft in a counterclockwise direction as viewed in FIG. 4 so that the cutting head is normally positioned substantially parallel to the plate member 146. If desired a rubber bushing similar to the bushing 168 may be provided within the sleeve 126 around the above described shaft 124 at the end of the boom arm for providing additional means for taking up shocks during operation of the apparatus.

As shown in FIGS. 4, 5 and 21–24, the cutting head 50 comprises upper and lower plate members 172 and 174 which are secured together in spaced apart parallel relationship. A cutting blade 176 is pivotally mounted by a pin 178 to intermediate portions of the plate members 172 and 174. As shown best in FIGS. 21 and 23, forward end portions 180 and 182 of the plate members 172 and 174 provide one jaw of the cutting head disposed in opposing and cooperative relationship with respect to the blade member 176. It will be noted that these jaw portions are spaced apart so that the blade member 176 may pass therebetween during a severing operation so as to insure complete separation of a section from the remainder of the tree. It is also to be noted that a margin of the jaw portion 180 is provided with inwardly directed teeth 184 for gripping a tree and preventing it from being squeezed or cammed outwardly from between the jaw members and the blade during a cutting operation. In addition an edge 186 of the jaw portion 182 is sharpened for biting into the tree and aiding in the cutting operation and also preventing the cutting head from slipping along the tree during the cutting operation.

The plate members 172 and 174 include tail portions 188 and 190 extending rearwardly and angularly from the jaw portions as shown best in FIGS. 21 and 22. In order to actuate the cutting blade, a double acting hydraulic cylinder 192 is pivotally connected by pin means 194 with ends of the tail portions 188 and 190. The cylinder is adapted to actuate a forwardly extending piston rod 196 which is connected with the outer end of the blade member by a pin 198. Arcuately arranged bearing means 200 and 202 are disposed along and secured against the inner surfaces of the plate members 172 and 174 respectively as shown in FIGS. 21 and 22 for engaging and guiding the blade member.

When it is desired to fell a standing tree, the vehicle is driven to a point adjacent the tree while the cutting head is retracted at least to the intermediate broken line position shown in FIG. 5. When the vehicle has been positioned so that the tree is aligned with the cutting head, the cylinder 112 is actuated to lower the boom arm so that the cutting head is lowered to permit the opposing jaw and blade portion thereof to embrace the tree. In addition the cylinder 152 is operated to position the cutting head horizontally or, if desired, to position the cutting head at an angle to the horizontal which, for example, might be as shown by the lowermost broken line position of the cutting head in FIG. 5. In the event adjustment of the cutting head transversely of the tree is necessary in order to locate the tree properly between the jaw and blade members, the cylinder 108 is actuated. It will be appreciated that these adjustments of the cutting head may be quickly and easily accomplished without requiring extensive or difficult manipulation of the vehicle as a whole. When the cutting head is properly positioned, the cylinder 192 is actuated for shifting the blade member 176 from the open position shown in FIG. 21 to the closed position shown in solid lines in FIG. 21 in order to accomplish the tree cutting and felling operation. It is to be noted that the blade member is wedge-shaped and the cutting head is constructed and arranged so that when the blade member reaches substantially the fully closed position shown in FIG. 21 it extends substantially perpendicularly to the longitudinal axis of the vehicle. As a result the wedging action of the blade guides the severed tree and causes it to fall forwardly along the side of the vehicle and substantially parallel to the longitudinal axis of the vehicle.

As indicated above, the traversing or feeding means 44 is disposed at an elevated location on the vehicle and the mechanism 46 is adapted to lift a felled tree up to and place the tree on the feeding means. More specifically, the lifting means 46 which is shown in FIGS. 1, 2, 6, 7 and 8 comprises a large flattened hook member 204 adapted to be positioned flush against the ground at the side of the vehicle for catching a tree as the tree is felled by the cutting head 50 along a line generally parallel to the longitudinal axis of the vehicle. The hook member is welded or otherwise secured to a block 206 which in turn is pivotally mounted on an outer end of an arm structure 208 by a pin 210. The opposite end of the arm structure is pivotally connected by a pin 212 to bracket means 214 welded or otherwise secured to the side of the vehicle at a point generally midway between the ground and the feeding means 44. The block 206 and thus the hook member 204 is free to pivot relative to the arm structure except that a stop member 216 is provided on the arm structure for engaging a complementary stop portion 218 of the block for limiting pivotal movement of the hook in a counterclockwise direction as viewed in FIGS. 7 and 8. Preferably these complementary stop elements are located so that they are slightly spaced apart when the hook member rests horizontally on the ground with the arm structure 208 in the fully lowered position shown in full lines in FIGS. 7 and 8. This arrangement enables the hook member 204 to assume a slightly downwardly inclined position in the event that the ground is not level.

In order to actuate the arm structure 208, a single acting hydraulic cylinder 220 is provided, which cylinder is pivotally mounted at its upper end by a pin 222 extending between vertically elongated bracket members 224 and 226 which are secured to the side of the vehicle. A piston rod 228 extending from the lower end of the cylinder is pivotally connected by a pin 230 to bracket means 232 welded or otherwise secured to an intermediate portion of the arm structure 208. It will be appreciated that when the cylinder is operated so as to retract the piston rod 228, the arm 208 and hook member 204 will be raised from the lowermost tree receiving position shown in solid lines in FIGS. 7 and 8 through the raised broken line positions shown in FIG. 8 to the uppermost broken line position shown in FIG. 7 at which the tree trunk carried by the hook member is deposited onto the feeding means 44.

It is to be noted that the block 206 includes a cam finger portion 234 extending rearwardly of the pivot pin 210 and from the hook member 204 and adapted to engage a roller 236 mounted on a shaft 237 extending between lower end portions of the bracket members 224 and 226 as shown in FIGS. 2 and 6–8 when the lifting mechanism has been raised to the uppermost position shown in broken lines in FIG. 7. Engagement of the cam finger 234 causes the hook member 204 to be tilted over and past a dead center position so that a tree trunk carried by the generally V-shaped hook member will be dumped therefrom and onto the feeding means. Upward and dumping movement of the hook member is limited by engagement of a stop surface 238 on the block member 206 at the inner end of the cam finger portion 234 with the roller 236. The block member includes another cam finger 240 extending from the stop surface 238 and generally opposing the cam finger 234. The cam finger 240 is formed with a bump or raised surface for engaging the roller 236 when the hook member 204 is lowered after dumping a tree onto the feeding means. Such engagement of the cam finger 240 with the roller 236 causes the hook member 204 to be pivoted about the pin 210 back past the dead center position until the stop 218 engages the stop 216. It is to be noted that this resetting of the hook member takes place at an elevated position so as to eliminate any danger of injury to nearby workmen as a result of flipping movement of the hook member.

The feeding means 44 which is shown in FIGS. 1–3 and 14–18 comprises an elongated frame 242 having a hollow box-like cross section as shown best in FIGS. 16–18. A forward end of the frame is secured to a bracket structure 244 which in turn is fixed to a side of the vehicle, and a trailing end of the frame is fixed to an end plate 246 which in turn is welded or otherwise secured to braces 248 and 250 extending from the vehicle. Rails or track members 252 and 254 extend along the opposite sides of the frame 242 for supporting a tree feeding carriage 256. It is to be noted that, as shown best in FIG. 2, the frame 242 is inclined upwardly from the forward end bracket means 244 and relative to the longitudinal axis of the vehicle. In addition, as shown best in FIG. 3, the frame 242 is inclined inwardly from the forward end bracket 244 and with respect to a vertical plane containing the longitudinal axis of the vehicle. In other words, the frame member 242 is arranged so that the carriage 256 is adapted to direct a tree trunk upwardly and laterally inwardly from the forward end of the vehicle to a position over the cart portion 36 of the vehicle so that when a section is severed from the trunk in the manner described below it will fall directly into the cart.

The carriage structure 256 comprises opposite side members 258 and 260 respectively carrying sets of upper and lower rollers 262—264 and 266—268 which engage the track members 252 and 254 and support the carriage thereon. A saddle structure 270 is mounted on a horizontal plate 272 extending between and connecting portions of upper margins of the side members 258 and 260. The saddle structure includes a pair of V-shaped blades 274 and 276 for receiving and retaining a tree trunk 277 as shown best in FIG. 16, which blades are also inclined in the direction of feeding movement as shown in FIG. 14 for resisting any tendency of the tree trunk to slip relative thereto during such feeding movement.

The carriage structure also includes means for releasably clamping the tree trunk against the saddle blades 274 and 276 during feeding thereof. This means which is shown in FIGS. 1, 2 and 14–16 comprises a gripping or clamping pad 278 welded or otherwise secured to a sleeve 280 which is pivotally carried on an outer end portion of an arm 282. Preferably the clamping pad is provided with teeth 284 facing in the direction of feeding movement for engaging and preventing slipping of a tree trunk.

The arm 282 which is bent or looped in the manner shown in FIG. 16 so as to avoid interference with a tree trunk has its inner end welded or otherwise secured to a bearing sleeve 286 which is pivotally mounted on a shaft 288 extending between upstanding brackets 290 and 292 welded or otherwise secured to opposite side members 258 and 260 of the carriage structure. A lever 294 is also fixed to the sleeve 286 as shown best in FIGS. 2 and 14 which lever is actuated in the manner described below for lowering the arm 282 for clamping the pad 278 against a tree trunk during a feeding operation and for raising the arm 282 to the position shown in FIG. 1 while the carriage structure is being returned to the forward end of the track after completing a feeding stroke.

Means is provided for maintaining the clamping pad 278 substantially parallel to the effective tree supporting surface of the saddle structure regardless of the position of the arm 282 so that the pad is always properly positioned for engaging tree trunks regardless of variations in the diameter of the trunks. In other words, the pad 278 will always be maintained substantially parallel to the longitudinal axis of a tree supported on the saddle of the carriage means. The means for positioning the clamping pad in this manner comprises a linkage structure. More specifically, a link 298 (FIG. 14) extends along the arm 282 and has one end pivotally connected to a short lever 300 secured to the clamping pad supporting sleeve 80 and an opposite end connected with a fixed pivot pin 302 offset from the axis of the shaft 288.

A double acting hydraulic cylinder 304 is disposed within the elongated frame structure 242 for actuating the carriage structure. The cylinder has one end anchored with respect to the end plate 246 of the frame structure as shown best in FIG. 14. A piston rod 306 operable by the cylinder extends forwardly therefrom and carries at its outer end a plurality of sprocket wheels 308, 310 and 312 as shown in FIGS. 14, 15 and 16. A pair of identical chains 314 and 316 extend from an anchor 318 shown in FIG. 14 forwardly and around the sprocket wheels 308 and 312 respectively and then rearwardly around additional sprocket wheels 320 and 322 rotatably supported by an axle 324 which in turn is mounted on bracket means 326 secured to the end plate 246 of the frame structure. The chains then extend forwardly from the sprocket wheels 320 and 322 and are connected to an outer end of the lever 294 by suitable anchoring means 323 as shown best in FIG. 14. With this arrangement it will be appreciated that when the cylinder 304 is actuated so as to extend the piston rod 306 and advance the sprocket wheels 308 and 312 toward the forward end of the frame and track structure, the chains 314 and 316 will pull on the lever 294. This pulling action causes the lever 294 and thus the arm 282 to rotate in a clockwise direction as viewed in FIG. 14 for urging the clamping pad 278 securely against a tree trunk. Further pulling action of the chains causes the carriage to be advanced upwardly along the track structure carrying the tree trunk therewith. Preferably a spring biased detent 330 is provided adjacent the forward end of the frame and track structure as shown in FIG. 14 for releasably engaging a complementary abutment 332 provided on the carriage structure and thereby restraining the carriage structure until the pulling action of the chain has caused the clamping pad to be engaged against a tree trunk with a predetermined and substantial force. Thus any possibility of the tree slipping relative to the carriage is minimized so that the structure is adapted to feed a predetermined length of the tree during each feeding stroke of the carriage structure, which length corresponds closely to the length of feeding movement of the carriage structure.

Another chain 334 is anchored by suitable means 336 at the forward end of the frame and track structure as shown best in FIG. 14. This chain extends rearwardly around the sprocket wheel 310 and then forwardly around another sprocket wheel 338 which is rotatably supported at the forward end of the frame and track structure. The chain 334 then extends rearwardly and is connected with the outer end of the arm 294 by suitable anchor means 340. The chain 334 serves to pull forwardly on the arm 294 when the cylinder 304 is actuated in a manner which retracts the piston rod 306. Such a forward pull by the chain 334 initially rotates the lever 294 and thus the arm 282 in a counterclockwise direction for disengaging the clamping pad 278 from a tree trunk. Then continued pulling action by the chain 334 causes the carriage structure to be returned to the forward end of the track means.

As indicated hereinabove, the means 48 is constructed so as to cut and remove limbs from a tree trunk as the tree is advanced by the feeding means during a sectionalizing or bucking operation. The delimbing means 48 is shown in FIGS. 1, 2 and 8–13 and comprises an inverted generally C-shaped arm structure 342 having one end pivotally supported by a shaft 344. The shaft 344 is in turn supported by suitable bracket means 346 secured to the vehicle so that the shaft is arranged with its axis generally parallel to the longitudinal axis of the frame and track structure of the feeding means. As shown best in FIGS. 8 and 10, a double acting hydraulic cylinder 348 having a piston rod 350 extending therefrom is provided for shifting the arm structure 342 between the fully lowered or closed position shown in FIGS. 8 and 10 and the raised or opened position shown in FIG. 1. The outer end of the piston rod 350 is connected by a pin 352 to the arm structure 342 at a point disposed laterally outwardly of the shaft 344, and an oppositely disposed end of the cylinder is pivotally connected by pin means 354 to a suitable bracket structure 355 fixed to the side of the vehicle.

A pair of spaced apart plate or frame members 356 and 358 is secured to the side of the vehicle beneath the pivot point of the arm structure 342 as shown in FIGS. 1, 2, 8 and 10. It will be observed that when the arm structure 342 is in the raised position shown in FIG. 1, the space between the end of the arm structure and the ends of the plate or frame members 356 and 358 is sufficient to permit a tree trunk to pass therethrough and onto the members 356 and 358 when the tree is deposited on the feeding means 44 by the lifting mechanism 46. It is to be noted that a generally V-shaped blade 360 is mounted at the upper margin of the plate member 358. The blade 360 is substantially in alignment with the V-shaped tooth members 274 ands 276 on the saddle structure of the feeding means carriage so that the tree trunk is adapted to rest on the blade as shown in FIG. 10 during a feeding operation. The blade member 360 is provided with a sharpened edge which projects forwardly so that as the tree is advanced by the feeding means, the blade 360 serves to cut any limbs which it may engage from the tree trunk.

The delimbing means 48 is provided with flexible and retractable cutting blade means 362 shown best in FIGS. 1, 10 and 13 for complementing the blade member 360 so that the mechanism is capable of cutting limbs from a tree trunk entirely around the trunk and regardless of the diameter of the trunk within, of course, the limits of the apparatus. The flexible blade means 362 is chain-like and is composed of a plurality of links 364 having the structure shown best in FIG. 13. Each link comprises a forwardly projecting sharpened blade portion 366 which combines with the blade portion of the remaining links to provide an essentially continuous annular cutting edge when the chain is wrapped around a tree trunk. Each link 364 is preferably of rigid one piece construction and comprises pairs of apertured ears 368—370 and 372—374 which are spaced from each other substantially transversely of the chain and are adapted to receive therebetween additional apertured ears 376 and 378 extending from an adjacent link. The mating and aligned apertured ears are pivotally connected by suitable pin means 380. The underside of the blade portion 366 of each link is bevelled as shown in FIG. 13 so as to prevent the blades from digging into the trunk during a delimbing operation.

As shown best in FIG. 10, one end of the flexible blade structure 362 is pivotally connected to and anchored by a pin or shaft 382 which is fixedly mounted between the plate or frame members 356 and 358. The opposite end of the flexible blade 362 extends to and is connected by means of a pin 384 to an apertured ear 386 fixed on the surface of a drum 388 rotatably supported by a shaft 390 carried by an outer end portion of the arm structure 342 as shown best in FIGS. 10, 11 and 12. It is to be noted that the arrangement is such that when the arm structure is completely closed as shown in FIG. 10, opposite end portions of the flexible blade 362 overlap opposite end portions of the fixed V-shaped blade 360 so as to present a limb cutting edge entirely around the tree.

As will be understood, tree trunks to be handled by the apparatus will vary widely in diameter. In order to adjust the flexible blade chain or structure 362 for severing branches at a point close to the tree trunk, means is provided for resiliently biasing the drum 388 in a manner which causes the drum to draw the blade chain snugly around the tree trunk. More specifically, as shown in FIGS. 11 and 12 the shaft 390 is fixed against rotation while the drum 388 is free to rotate relative to the shaft. Spiral springs 392 and 394 are disposed within the drum which springs have inner ends secured to hub members 396 and 398 respectively which are in turn fixed to the shaft 390. Outer ends of the springs are fixed to the drum 388 in the manner shown at 400 in FIG. 12 or any other desired manner. The springs are preenergized so that they are adapted to rotate the drum 388 sufficiently to wrap the entire length of the blade chain 362 on the drum in the absence of a tree trunk. Thus the chain may be maintained snugly around a tree of any diameter and will be continuously adjusted and drawn around a tree trunk as the diameter thereof decreases while the tree is being fed or advanced during a sectionalizing or bucking operation.

The structure of the individual links 364 of the blade chain provides the chain with a substantial transverse dimension and considerable resistance to transverse deflection during a delimbing operation. However, in order to support a portion of the chain opposite from the anchored ends thereof and thereby resisting twisting of the chain and binding of the chain on the tree, a brace 402 is provided as shown best in FIGS. 8 and 10. This brace has one end portion pivotally supported by a pin 404 carried by bracket means 406 secured to the side of the vehicle. The brace comprises a laterally extending flange portion 408 which is adapted to overlie and rest on the chain and a vertical flange portion 410 which is adapted to engage and support the edge of the chain. The brace is free to pivot on the pin 404 so that it will automatically follow and rest on the chain regardless of the diameter of the tree being processed. As indicated best in FIG. 10, an end portion of the brace opposite from the pivot pin 404 extends between side members of the arm structure 342 and is engageable with a side member of the arm structure 342 so that the brace itself is supported against twisting during a delimbing operation.

FIG. 25 shows schematically a portion of the hydraulic control system of the apparatus. The portion of the control system shown herein is adapted to operate the various cylinders of the mechanisms mounted on the vehicle, and for a further portion of the hydraulic control system which is utilized for steering the vehicle reference is made to the abovementioned copending application.

The portion of the hydraulic system shown comprises a suitable pump 412 which is driven by the engine or prime mover of the tractor unit 34 of the vehicle. An inlet 414 of the pump connects with a hydraulic fluid reservoir 416 and an outlet line 418 extends from the pump to an inlet manifold of a control valve bank 420. The outlet line also is connected with a relief valve 422 in a conduit extending back to the reservoir so that any excess fluid delivered by the pump will be returned to the reservoir. A drain 424 extends from a drain manifold of the valve bank assembly 420 to the reservoir 416.

A first manually operable valve 426 in the valve bank structure is connected by conduits 428 and 430 and suitable branch conduits with opposite ends of a pair of hydraulic cylinders 432 and 434. These cylinders form a part of the cart unit 36 of the vehicle, which cart may be tilted or dumped for depositing a load of logs on end onto the ground. The cylinders 432 and 434 are arranged for controlling tilting of the cart. For additional details as to the structure of the cart and the manner in which it may be operated reference is hereby made to the abovementioned patents.

Conduits 436 and 438 extend from the pressure and drain manifolds of the valve bank structure 420 to inlet and drain ports of a two-position solenoid operated valve 440. Additional conduits 442 and 444 extend from the valve 440 to opposite ends of the blade actuating cylinder 192. Solenoids 446 and 448 are provided for controlling the valve 440 and these solenoids may be actuated in the manner described below for selectively manually or automatically operating the cutting blade.

Additional manually operated valves 450, 452, 454 and 456 are included in the valve bank for controlling the various cylinders associated with the cutting head and boom arm structure. The valve 450 is adapted to connect a conduit 458 extending from the cylinder 112 with either the pressure or drain manifold of the valve bank structure. The valve 452 is connected by conduits 460 and 462 with opposite ends of the cylinder 108. The valves 454 and 456 are similarly connected with opposite ends of the cylinders 136 and 152 by pairs of conduits 464—466 and 468—470.

The single acting cylinders 220 and 348 respectively included in the lifting and delimbing means are connected with additional valves 472 and 474 included in the valve bank structure. These additional valves are respectively connected with their associated cylinders by conduits 476 and 478.

The cylinder 304 of the feeding means has its opposite ends connected with a solenoid operated valve 480 similar to the valve 440 described above by conduits 482 and 484. Inlet and drain ports of the valve 480 are respectively connected with pressure and drain manifolds of the valve bank structure by conduits 486 and 488. Solenoids 490 and 492 are adapted to shift the stem of the valve 480, which solenoids may be controlled in the manner described below for obtaining either manual or automatic operation of the feeding means.

In FIG. 26 there is schematically disclosed a portion of the electrical control circuit of the apparatus. In accordance with a feature of the present invention this circuit is such that the feeding means cylinder and the cutting blade actuating cylinder may be manually operated or, alternatively, the circuit may be energized so that these cylinders will be automatically operated so as to feed and cut a tree until the entire tree has been sectionalized. More specifically the circuit comprises power lines L1 and L2. The valve operating solenoid 446 is connected between the power lines by branch lines 494 and 496. A manually operable pushbutton switch 498 is connected in the line 494 for enabling the solenoid 446 to be manually energized for shifting the valve 440 so as to cause closing of the cutting blade. The solenoid 448 associated with the valve 440 is also connected between the power lines by branch lines 500 and 502, and a manually operable switch 504 is connected in the line 500 for enabling the solenoid 448 to be manually energized for shifting the valve in a manner which causes the blade operating cylinder to open the cutting blade.

The solenoids 490 and 492 associated with the valve 480 are similarly connected between the power lines for manual operation. More specifically, solenoid 490 is connected with the power line L1 by a line 506 having a manually operable normally open switch 508 connected therein. A wire 510 connects the solenoid 490 with the line L2. Wires 512 and 514 respectively connect the lines L1 and L2 with the solenoid 492 and the wire 512 has a manually operable normally open switch 516 connected therein.

In order to accomplish automatic operation of the valves 440 and 480 and thus automatic operation of the cutting blade and feeding means, relays CR–1, CR–2, CR–4 and CR–3 are provided. The relay CR–1 is adapted to close a normally open switch 518 in a wire 520 connecting a power line L3 with the solenoid 446. Similarly the actuator of the relay CR–2 is adapted to close contact means 522 in wire 524 which in turn is connected between the power line L3 and the solenoid 448. The relays CR–3 and CR–4 are respectively adapted to close contact or switch means 526 and 528 connected in wires 530 and 532 extending between the power line L3 and the solenoids 492 and 490 respectively. It will be appreciated that by energizing the relays in a manner described below automatic operation of the feeding means and the cutting blade is obtained.

The circuit for controlling the relays comprises a master switch 532 in a wire 534 connecting the power line L3 with the power line L1. Thus when the switch 532 is closed, the power line L3 is energized so that the various control circuits for the relays may in turn be energized.

The control circuit for the relay CR–1 comprises a wire 536 extending from the power line L3 to a contact of the actuator of the relay CR–1. An opposite contact of the relay actuator is connected with the line L2 by a wire 538. It is to be noted that connected in series in the wire 536 are limit switches 540 and 542, normally closed switch or contact means 544 of the relay CR–2, and normally closed switch or contact means 546 of the relay CR–3. The limit switch 540 is normally closed and is mounted in association with the cutting head so that it is open only when the cutting blade is opened a predetermined small amount which, strictly by way of example, may be about three inches. The limit switch 542 is normally opened and is disposed in association with the feeding means 44 so as to be closed when the carriage structure of the feeding means reaches the end of its upward or feeding stroke.

Another wire 548 extends between the power line L3 and the wire 536 in a manner which by-passes the limit switches 540 and 542. A normally open limit switch 550 is connected in the wire 548 and is disposed in association with the feeding means 44 so that it is closed when the feeding means carriage is at a starting position at the lower or forward end of the track. In addition normally open contact means 552 of the relay CR–1 is connected in parallel with the limit switch 542 by a wire 554 which extends between the wires 536 and 548.

Assuming the feeding means carriage to be in the fully retracted or starting position and also assuming the blade of the cutting means to be fully opened, the control circuit for the relay CR–1 will be in a condition in which the limit switches 540 and 550 are closed. Thus the relay CR–1 will be energized upon closing of the main switch 532 so that the switch 518 will be closed for energizing the solenoid 546 and shifting the valve 440 in a manner which causes the cutting blade to be actuated for severing a section from a tree. If on the other hand the carriage is at the end of a feeding stroke, the limit switch 542 will be closed so that the relay CR–1 will be energized through the wire 536. When this occurs the contact means 552 of the relay will be closed for maintaining the relay in an energized condition while the carriage is returned to its starting position, which movement of the carriage permits the switch 542 to open.

The control circuit for the relay CR–2 comprises a wire 554 extending from the power line L3 to the actuator of the relay and a wire 556 extending from the relay actuator to the power line L2. A limit switch 558 is connected in the wire 554, which limit switch is normally open and is associated with the cutting head so that it is closed only when the cutting blade finishes a cutting operation and is in a closed position. This portion of the circuit also comprises normally open contact means 560 of the relay CR–2 and a normally closed limit switch 562 which are connected in series with each other and in parallel with the limit switch 558 by a wire 564. When the cutting blade reaches a fully closed position, the limit switch 558 is closed so that the relay CR-2 is energized for closing the switch 522 and energizing the solenoid 448 for shifting the valve 440 in a manner which causes the cutting blade to be actuated toward its opened or retracted position. When the cutting blade leaves its fully closed position, the switch 558 opens but before this occurs the contact means 560 of the relay is closed to maintain the relay CR-2 in an energized condition. When the cutting blade reaches a desired fully open position, the limit switch 562 is opened so that the relay CR-2 is deenergized. It will also be noted that when the relay CR-2 is energized the contact means 544 thereof is opened so that the relay CR-1 is deenergized.

The control circuit for the relay CR-3 comprises a wire 564 extending from the power line L3 to the actuator of the relay and another wire 566 extending from the relay to the power line L2. Limit switches 568 and 570 are connected in series in the wire 564. The limit switch 568 is normally closed and is associated with the feeding means 44 so that it is opened when the carriage of the feeding means arrives at the end of a feeding stroke. The limit switch 570 which is normally open is associated with the cutting head and is disposed so that it is closed only when the cutting blade is in the fully opened position. Contact means 572 of the relay CR-3 is connected in parallel with the limit switch 570 by a wire 574. With this arrangement the relay CR-3 is energized for closing the switch 526 and actuating the solenoid 492 for shifting the valve 480 for causing feeding movement of the carriage when the cutting blade is in a fully open position. However, in order to minimize time delays, the cutting blade is immediately started toward the closed position after it arrives at the open position and therefore the contact means 572 of the relay CR-3 is closed when the relay is initially energized for maintaining the relay in an energized condition until the feeding means carriage advances sufficiently to open the limit switch 568. It will be noted that when the relay CR-3 is energized the contact means 546 thereof is opened so as to prevent cutting movement of the blade during feeding movement of the carriage.

The control circuit for the relay CR-4 comprises a wire 576 extending from the line L3 to the actuator of the relay CR-4 and the wire 578 extending from the relay to the line L2. A limit switch 580 and a pressure switch 582 are connected in series in the wire 576. The limit switch 580 is normally closed and is associated with the feeding means so that it is opened when the carriage of the feeding means returns substantially to its starting position. The pressure switch 582 is normally open and is associated within the cutting head so that when the cutting blade initially engages a tree during a cutting stroke, the pressure switch is closed so that the relay CR-4 will be energized to close the switch 528 for operating the valve 480 to initiate returning movement of the feeding means carriage. Contact means 584 of the relay CR-4 is connected in parallel with the pressure switch by a wire 586. This contact means is normally open but is closed when the relay is energized for assuring that the relay CR-4 will remain energized until the carriage opens the limit switch 580 even though the cutting operation may first be completed and the pressure switch 582 may be open.

The method of harvesting trees in accordance with the present invention may be summarized as follows. The vehicle is driven to a point adjacent a tree to be felled and the cutting head is lowered and adjusted vertically and horizontally, if necessary, so that the cutting head is disposed as close to the ground as possible and so that the tree is located between the jaw portion and blade member of the cutting head. In addition, the lifting mechanism is actuated so that the hook member 204 is disposed on the ground. Then the operator closes the manual operation switch 498 so that the cutting blade is advanced for severing the tree. As mentioned above, the blade is constructed and arranged so that it directs the falling tree onto the hook member 204 of the lifting mechanism.

The lifting mechanism 46 is then actuated so as to raise the trunk of the tree onto the carriage of the feeding means and into the delimbing means 48. The cylinder 348 of the delimbing means is actuated for closing the arm structure 342 around the tree trunk. Then the manual operation switch 516 is closed for actuating the feeding means so as to advance the carriage which pulls the tree through the delimbing means. However, it will be noted that before the switch 516 is closed to actuate the feeding means, the operator manually operates the cylinders 108, 112, 136 and 152 associated with the boom arm 52 and cutting head 50 so as to raise the cutting head and turn it into a plane extending transversely of the longitudinal axis of the vehicle and locate the cutting head in alignment with the feeding means as shown by the uppermost broken line portion of FIG. 5. Thus, when the feeding means is actuated, a length of the tree trunk corresponding to the length of the feeding stroke of the carriage is advanced through the cutting head and over the cart 36 as shown in broken lines in FIG. 1.

The cutting head and feeding means may subsequently be operated manually if desired, but preferably the automatic operation switch 532 is closed. When this occurs the relay CR-1 is energized so as to initiate the cutting movement of the blade member and when the blade member engages the tree the pressure switch 582 is closed so as to energize the relay CR-4 for initiating returning movement of the carriage. Upon completion of the cutting operation, the relay CR-1 is deenergized and the relay CR-2 is energized in the manner described more in detail above so that the cutting blade is returned to its open position. Of course when the section of the tree is severed from the remainder of the trunk it falls directly into the cart. While the cutting blade is completing its closing or cutting and then opening movements, the feeding means carriage is returned to its starting position so that when the cutting blade reaches a predetermined open position the limit switch 570 is closed and the relay CR-3 is energized to initiate the next feeding stroke of the carriage. When the carriage again reaches the limit of its feeding stroke the limit switch 542 is closed so that the relay CR-1 is reenergized and the cycle of operation is repeated. The operation of the apparatus will continue until substantially the entire tree has been sectionalized and deposited in the cart.

When the desired stack or bundle of logs has been accumulated in the cart 36, the logs may be discharged in accordance with any of the procedures set forth in the above mentioned patents. A preferred procedure when the logs are to be temporarily stored on the ground is to actuate the cylinders 432 and 434 for tilting the cart 36 so that the logs are deposited on end on the ground. As set forth in the previously mentioned patents, a bundle of logs deposited on end in this manner may be tied and handled more advantageously. Reference is made to the aforementioned patents for details of the cart construction and operation whereby the logs may be deposited on end onto the ground.

While the preferred embodiment of the present invention has been shown and described herein, it is obvious that many structural details may be changed without departing from the spirit and scope of the appended claims.

The invention is claimed as follows:

1. In a tree processing apparatus, a mobile vehicle, power operated means on said vehicle for severing sections from a fallen tree, means mounted on said vehicle and including gripping means for intermittently feeding a felled tree relative to the vehicle for positioning successive sections of the tree to be severed in association with said severing means, and means mounted on said vehicle and movable between a position resting on the ground and an elevated position for catching a tree as the tree is felled and then lifting the tree into association with said gripping means.

2. In a tree processing apparatus, a mobile vehicle including means for receiving a plurality of tree sections and retaining said sections in stacked relationship, means mounted on said vehicle for intermittently feeding a felled tree relative to the vehicle for positioning successive unsevered sections of the tree over said receiving and retaining means, means mounted on said vehicle in alignment with said feeding means for severing branches from a tree during feeding movement of the tree, means mounted on said vehicle for severing said sections from the tree when said sections are positioned over said receiving and retaining means, and means mounted on said vehicle and movable between a position resting on the ground and an elevated position for catching a tree as the tree is felled and for then lifting the tree into association with said feeding means and said branch severing means.

3. In a tree processing apparatus, a mobile vehicle including means for receiving a plurality of tree sections and retaining said sections in stacked relationship, power operated means on said vehicle and selectively positionable at a lowered position for severing a standing tree and at an elevated position for severing sections from a felled tree, and means mounted on said vehicle and including gripping means for intermittently feeding a felled tree relative to the vehicle and up and over the vehicle for positioning successive unsevered sections of the tree over and substantially above said receiving and retaining means and in association with the severing means when the severing means is in said raised position so that a plurality of such tree sections will fall directly onto the receiving and retaining means and into predetermined relationship when they are severed from the remainder of the tree.

4. In a tree processing apparatus, a mobile vehicle, power operated means on said vehicle for severing a standing tree and directing the fall of such tree along a line generally parallel with a longitudinal axis of the vehicle, and means mounted on said vehicle for engaging and catching the tree only upon substantial completion of the falling of the tree along said line and for then raising and positioning the tree for further processing.

5. In a tree processing apparatus, a mobile vehicle including means for receiving a plurality of tree sections and retaining said sections in stacked relationship, means mounted on said vehicle for intermittently feeding a felled tree relative to the vehicle for positioning successive unsevered sections of the tree over said receiving and retaining means so that when said sections are severed they will fall directly onto said receiving and retaining means, power operated means on said vehicle for severing a standing tree and directing the fall of the tree along a line extending generally parallel to a longitudinal axis of the vehicle, and means mounted on said vehicle for engaging and catching said tree only upon substantial completion of the fall thereof and for subsequently raising and positioning the tree in association with said feeding means.

6. An apparatus, as defined in claim 5, which includes means adjustably mounting said severing means for selectively positioning the severing means for felling a standing tree and for severing successive sections from the unfallen tree when said sections are positioned over said receiving and retaining means.

7. An apparatus, as defined in claim 6, wherein said means mounting said severing means comprises a boom arm, and means mounting said boom arm for pivotal and transverse adjustment relative to said vehicle.

8. In a tree processing apparatus, a mobile vehicle including dump cart means for receiving a plurality of tree sections and retaining said sections in stacked relationship with their axes in generally parallel relationship and for subsequently depositing the stack of tree sections on end onto the ground, means mounted on said vehicle and including gripping means movable generally longitudinally of the vehicle for intermittently feeding a felled tree generally longitudinally of the vehicle for positioning successive unsevered sections of the tree over said cart, and means on said vehicle for successively severing said sections from the tree when said sections are respectively disposed over said cart.

9. An apparatus, as defined in claim 8, wherein said feeding means is disposed substantially along one side of said vehicle and is inclined laterally inwardly for feeding a felled tree from said one side of the vehicle inwardly to a position over the cart.

10. An apparatus, as defined in claim 9, wherein said feeding means is also inclined upwardly from said side of the vehicle for facilitating feeding of a raised end portion of a tree while an opposite end portion of the tree may be resting substantially on the ground.

11. In a tree processing apparatus, a mobile vehicle including means for receiving a plurality of tree sections and retaining said sections in stacked relationship, means mounted on said vehicle for intermittently feeding a felled tree relative to the vehicle for positioning successive unsevered sections of the tree over said receiving and retaining means, means comprising a flexible chain structure including sharpened blade elements along an edge thereof facing into the direction of travel of the felled tree for encircling the trunk of such tree associated with said feeding means and severing branches from the tree during feeding movement thereof, and means mounted on said vehicle for severing successive sections from the tree when said sections are disposed over said receiving and retaining means.

12. An apparatus, as defined in claim 11, wherein said means for severing branches from the tree comprises a fixed blade member arranged transversely to the path of travel of said tree with its edge facing into the direction of travel of the felled tree, means fixing one end of said chain structure in overlapping relationship with one end portion of said blade member, and means for locating an opposite end portion of the chain structure substantially in overlapping relationship with an opposite end of said blade member and for yieldably winding up said opposite end portion of the chain structure for adjusting the chain to the diameter of a tree trunk being processed.

13. In an apparatus for processing trees, means for severing branches from a tree trunk being fed along a predetermined path of travel, said means comprising a flexible chain structure including a plurality of pivotally connected link means, each of said link means including a sharpened blade element along one edge of the chain structure, and means for looping the chain structure around the trunk of a tree being processed with the sharpened blade elements facing into the direction of travel of the tree trunk.

14. An apparatus, as defined in claim 13, wherein said means for looping the chain structure around a tree trunk comprises means for yieldably winding up one end portion of the chain structure for adjusting the chain structure to the diameter of a tree trunk being processed.

15. An apparatus, as defined in claim 13, wherein said blade elements include beveled inwardly facing surfaces intersecting cutting edges thereof for resisting any tendency of the blade elements to dig into the trunk of a tree being processed.

16. A method of harvesting trees comprising positioning a vehicle including means for receiving and retaining a plurality of tree sections adjacent a tree to be harvested, felling said tree along a line extending generally parallel with the longitudinal axis of the vehicle, engaging and catching the falling tree during and only substantially at the completion of its fall to the ground, then lifting the tree from the ground and intermittently feeding said tree up and over and generally longitudinally of the vehicle for positioning successive sections of the tree over and substantially above the receiving and retaining means of the vehicle, and severing successive sections of the tree positioned over said receiving and retaining means so that a plurality of the severed sections will be deposited by gravity directly onto the receiving and retaining means in stacked relationship.

References Cited in the file of this patent

UNITED STATES PATENTS

| | | | |
|---|---|---|---|
| 1,915,435 | Miller | June 27, | 1933 |
| 2,482,392 | Whitaker | Sept. 20, | 1949 |
| 2,493,696 | Potstada | Jan. 3, | 1950 |
| 2,507,644 | Peters | May 16, | 1950 |
| 2,517,016 | Montague | Aug. 1, | 1950 |
| 2,572,347 | Johnson | Oct. 23, | 1951 |
| 2,662,640 | Dedo | Dec. 15, | 1953 |
| 2,727,335 | Susil | Dec. 20, | 1955 |
| 2,751,943 | Ford | June 26, | 1956 |
| 2,843,165 | Sherron | July 15, | 1958 |
| 2,845,101 | Hoadley | July 29, | 1958 |
| 2,876,816 | Busch et al. | Mar. 10, | 1959 |
| 2,882,941 | Pope | Apr. 21, | 1959 |
| 2,889,858 | Roberts | June 9, | 1959 |
| 2,955,631 | Hoadley | Oct. 11, | 1960 |
| 2,960,123 | O'Quinn | Nov. 15, | 1960 |
| 2,981,301 | Busch et al. | Apr. 25, | 1961 |

FOREIGN PATENTS

| | | | |
|---|---|---|---|
| 874,649 | France | May 18, | 1942 |